United States Patent [19]

Theyse

[11] 4,223,240

[45] Sep. 16, 1980

[54] FLYWHEEL SET FOR ACCUMULATING KINETIC ENERGY OF ROTATION

[75] Inventor: Frederik H. Theyse, Bensberg-Herkenrath, Fed. Rep. of Germany

[73] Assignee: Stichting Energieonderzoek Centrum Nederland, The Hague, Netherlands

[21] Appl. No.: 15,918

[22] Filed: Feb. 28, 1979

Related U.S. Application Data

[63] Continuation of Ser. No. 749,268, Dec. 10, 1976, abandoned.

[30] Foreign Application Priority Data

Dec. 18, 1975 [NL] Netherlands ............... 7514748

[51] Int. Cl.² .................................... H02K 7/02
[52] U.S. Cl. ........................ 310/74; 308/10; 74/572
[58] Field of Search ............... 310/74; 308/10; 74/572

[56] References Cited

U.S. PATENT DOCUMENTS

| | | | |
|---|---|---|---|
| 3,216,655 | 11/1965 | Wind et al. | 308/10 X |
| 3,518,469 | 6/1970 | Storsand | 310/74 |
| 3,683,216 | 8/1972 | Post | 310/74 X |
| 3,747,998 | 7/1973 | Klein et al. | 308/10 |
| 3,761,148 | 9/1973 | Grosbard | 308/10 |
| 4,002,378 | 1/1977 | Meinke | 308/10 X |
| 4,086,506 | 4/1978 | Kustom et al. | 310/74 |

Primary Examiner—Donovan F. Duggan
Attorney, Agent, or Firm—Cushman, Darby & Cushman

[57] ABSTRACT

Flywheel set for accumulating energy with elastically supported bearings, resulting in a low critical speed, lying at all times under the operational flywheelspeed.

The axial thrust taking bearings, or one bearing, may be operating with magnetic forces.

Spherical pivot bearings may be fitted both at the bottom and at the top of the rotor.

1 Claim, 7 Drawing Figures

FLYWHEEL SET FOR ACCUMULATING KINETIC ENERGY OF ROTATION

This is a continuation of application Ser. No. 749,268 filed Dec. 10, 1976, now abandoned.

The invention relates to a flywheel set for accumulating kinetic energy of rotation, equipped with at least one electric motor generator unit which is coupled to a flywheel rotor mounted rotatably about a preferably vertical shaft in a housing, the rotor being supported at both ends by means which permit radial displacements of these ends, and which displacements are directed against centring restoring forces.

Investigations of the applicant have established that known types of such flywheel sets have the disadvantage that a relatively large amount of energy is absorbed by bearing friction.

If an adequate amount of energy is to be accumulated and stored for a sufficient length of time in such flywheels, mainly two means are available for this purpose: on the one hand, raising the maximum speed of the rotor; on the other hand, increasing its moment of inertia while minimizing at the same time all kinds of frictional losses.

The properties of the materials that can be used for such a rotor impose restrictions upon increases of the maximum speed. This leaves the solution of increasing the accumulating capacity by increasing the moment of inertia of the rotor. The frictional losses, although dependent on the weight of the rotor, have nevertheless been found to be capable of being almost entirely eliminated.

The bearing friction can be divided into frictional losses resulting from radial forces acting on the bearing and from axial forces acting on it. A very important share in the frictional losses is constituted by the losses resulting from radial bearing forces. But the latter losses can be substantially reduced by using the design proposed by the applicant. This design provides for the means mentioned in the preamble to be so dimensioned that the critical rotor speed resulting from the elasticity of the supporting means and the rotor comes to lie sufficiently far below the lowest operational speed of the flywheel rotor. The simultaneous minimization of the dimensions resulting from this measure allows the total bearing loss—which in the case of a 1.5-ton flywheel rotor of the normal construction hitherto known can amount to almost 400 kW—to be reduced to only a fraction thereof, e.g., 400 W. To achieve this aim, each support is fitted with a damping member which, on the one hand, is connected to the foundation or the housing of the set, and on the other hand to the rotor, while the connection is produced on at least one side by a supporting member of relatively low resilience.

The rotor can be supported in part mechanically, in part magnetically, entirely magnetically, or entirely mechanically. For the mechanical bearings, use is preferably made of spherical pivot bearings, since these permit a swivelling motion inside the bearing of the connecting parts which connect the bearing to the housing and to the rotor. This swivelling motion improves adjustability, as a result of which large radial forces can no longer occur so that the frictional losses are correspondingly reduced.

It has been found that spherical pivot bearings can be fitted both at the bottom and at the top of the rotor. This is made possible at the top by using a bearing whose bearing cup has in its lower part an opening through which a hanging pivot shaft is passed, the upper end of which is rigidly fixed to the pivot sphere while the lower end is attached to the flywheel rotor. In another possible embodiment, the two spherical pivot bearings are prestressed against each other by means of suitable springs. It is furthermore possible to provide, in addition to a spherical pivot bearing at the bottom, a pin bearing with suitable spring action at the top, the aforementioned elasticity being furnished in the pin and the bearing being connected to the flywheel.

In order to separate the damping medium from the lubricating medium in the spherical pivot bearings, the bearing cup is so connected to a damping member which is loosely supported radially, that the damping gap which is provided around this damping member as well as the damping space communicating with it are sealed both at the top and at the bottom by means of a membrane. It will be efficient to design the damping member so that, being supported in a certain way, it can perform an oscillatory motion about a point situated inside the pivot sphere. This is a further measure tending to keep the radial forces which act upon the bearing at a low value.

In order to guide the aforementioned oscillatory motion, the preferably flat top membrane is placed in a horizontal or substantially horizontal plane through the centre of the pivot sphere, while the lower membrane is pleated. Checking and guiding the oscillator motion can also be improved by providing the underside of the support of the damping member with a spherical supporting surface in such a way that the centre of this spherical surface lies in the aforementioned pivot sphere. The mobility of this damping member can be enhanced by placing the spherical supporting surface on balls.

It is important to prevent lubricating fluid from penetrating into the inside of the rotor housing. To this end, the top bearing is so designed that lubricant is brought in near the equator of the pivot sphere, whereupon it flows through the film of oil of the pivot sphere and is discharged through the lower opening in the bearing cup, from where it passes along a draining cap which is fixed on the pivot shaft, and finally reaches a lubricant reservoir which is located inside the damping member and which is bounded on the inside by a cylinder wall, the lower end of which is sealed to the bottom of the damping member.

The flywheel rotor can consist of one or more thick-walled cylinders, as described in patent application No. 76 06 441 (B 77 Netherlands). Another possible embodiment consists in composing the rotor of a number of flywheels based on Laval discs, as described in patent application No. 76 06 440 (B 75 Netherlands). In this last case, a favourable embodiment is obtained if a terminal disc on the side of a rotor end is bounded by a plane surface. On such a plane surface, it is simple to fit the members necessary for the functioning of the rotor as a motor generator unit.

It has been found in practice that the discs of such rotors can perform a wobbling angular deflection, i.e., oscillate, which movement could be objectionable if it is desired to have the stator of the electric motor generator unit at a lateral flank of such a disc. In order to suppress this wobbling movement, an external flank of a terminal disc of the rotor is furnished with members for the magnetic or electromagnetic generation of repelling forces aimed at opposite members which are fitted in the inside wall of the housing. These members can consist of magnets which repel magnets fitted in the housing, or of electromagnetic supports of the type used for the magnetic suspension of rail vehicles.

A preferred embodiment on this principle combines the properties of such an electromagnetic floating bearing with a suitable DC or hysteresis motor.

A particularly favourable possibility of supporting a flywheel rotor is obtained if one rotor end is supported by at least one magnet which is fitted on a rotor flank opposite at least one second magnet attracted by it and fitted in the housing. The magnet or magnets supported in the housing is or are furnished with damping members and elastically supported with the aid of thin suspension wire or by one or more thin, resilient supporting rods placed underneath the magnet.

Some examples of embodiments of the invention will be explained in further detail on the basis of the following figures, of which:

Figure 1:
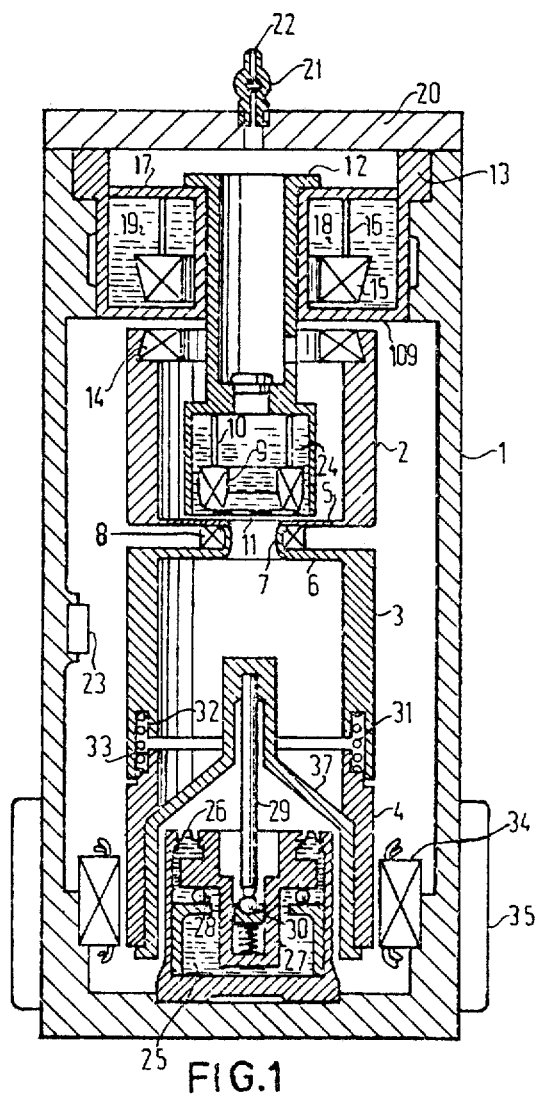
FIG. 1 is a vertical cross section through a flywheel set equipped with a rotor composed of thick-walled cylinders.

In FIG. 1, a housing 1 accomodates three cylinders 2, 3 and 4 which are combined to form a flywheel rotor. These cylinders are mutually connected by elastic joints. FIG. 1 shows two forms of embodiment of such joints.

The elastic joint fitted between the cylinders 2 and 3 consists of a folded-back part formed of relatively thin wall portions 5 and 6. Especially the wall portion 5 is made thin so as to make it flexible. The walls 5 and 6 are joined on the inside by a more cylindrical part 7. The elastic joint described hereinbefore is sufficient, even in this form, to be capable of performing the elastic function. The figure also shows, however, that it is possible to fit inside such an elastic joint a magnetic ring 8 attracted by a stationary magnetic ring 9 which is suspended inside a damping fluid from a number of thin wires or small rods 10. The magnetic rings 8 and 9 are so arranged opposite each other and separated by a very thin plate 11 that they attract each other, thus not only offering lateral support to the magnetic bearing 8, but also supporting part of the weight of cylinder 3. The stationary magnetic ring 9 is supported in the housing 1 by way of the suspension wires 10, the terminal flange 12 and finally the edge 13.

An analogous construction is used at the top of cylinder 2, causing the magnetic ring 14 to be attracted by the stationary magnetic ring 15 placed above it. This ring is likewise suspended with the aid of thin wires or small rods 16 from the lid wall 17 mounted above it. The space 19 is filled with a damping fluid, with slot 18 serving as damping gap. The housing is closed at the top with the lid 20 provided with a stop code 21 bearing a connecting stub 22. This code allows the space inside the housing 1 to be evacuated, whereupon the code 21 is closed. A getter mass 23, fixed in the inside wall of the housing 1, constitutes a further means for maintaining the vacuum. As a result of the vacuum thus created, the composite rotor 2, 3 and 4 can rotate very rapidly, without any possibility of friction being produced by a surrounding mass of gas.

A contributing factor in this respect is that the spaces 19, 24 and 25 containing fluids for damping purposes, are entirely sealed, so that no vapours can escape from them to impair the vacuum.

The damping fluid 25 is sealed under a membrane 26, which is sufficiently resilient to permit damping motions of the damping body 27. This damping body is supported in a known manner at the bottom, use being made of balls 28, which are capable of supporting without difficulty even the relatively heavy load of a long flywheel cylinder. A proper design of the supports also allows these balls to position the bearing accurately.

Finally, the part of the weight of the flywheel rotor not taken up by supporting magnets is transmitted by way of a pivot 29 to a bearing 30.

The figure shows furthermore another possible embodiment of an elastic link, which can be provided in the form of a helical spring 31, fitted in a pair of annular recesses 32 and 33 in the opposite ends of the cylinders 3 and 4.

The lower side of the outer jacket of cylinder 4 is acted upon by a stator 34, which can perform a motor function as well as a generator function. The outside of the housing bears a number of cooling fins 35 for absorbing and removing the heat generated in the electrical unit and in the mechanical bearing 30.

Figure 2:
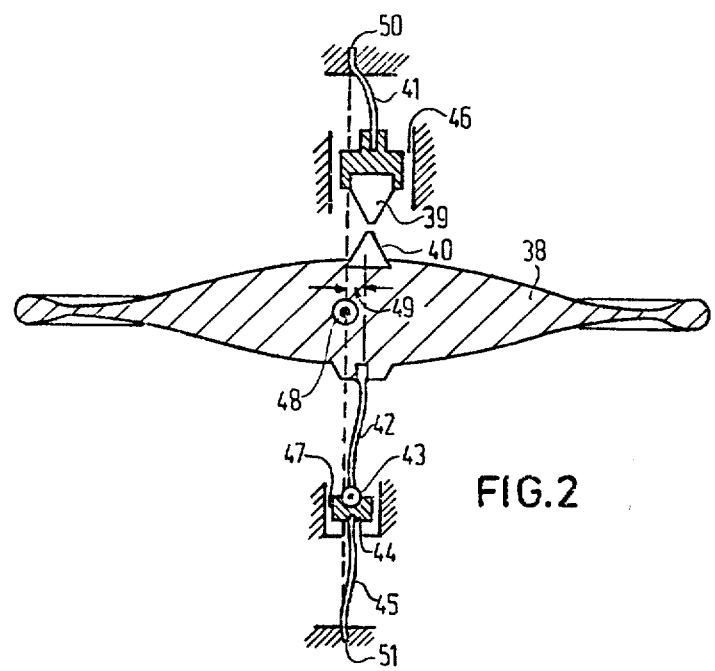
FIG. 2 is a vertical cross section which indicates schematically a magnetic support at the top of the rotor, and a mechanical support at the bottom.

FIG. 2 shows schematically, by means of a flywheel rotor consisting of a single disc, the principle of the supporting system for the case where the magnetic support is placed at the top and the mechanical support at the bottom. The rotor disc 38 is here supported at the top by two magnets 39 and 40 placed with the unlike poles one opposite the other, thus attracting each other. The stationary magnet 39 is supported by a small, flexible suspension rod 41 which is fitted in the housing. At the bottom there is a resilient pivot shaft 42, which ends in a pivot sphere 43, supported in a bearing block 44. This bearing block is supported by a flexible bar 45, the lower end of which is fitted in the housing. A damping medium can be provided in the damping gaps 46 and 47. The number 48 indicates the centre of gravity of the rotor. Since there is always a state of unbalance, this centre of gravity will not be in an entirely central position, but at some distance 49 from the connecting line between magnet 40 and pivot shaft 42. According to the invention, the centre of gravity of the rotor 48, will adjust itself at speeds above critical so as to coincide with the line which connects the supporting points 50 and 51. The bearing parts 39 and 44 then perform a small circular rotary motion but have to transmit much smaller radial forces than if they had been rigidly fastened.

Figure 3:
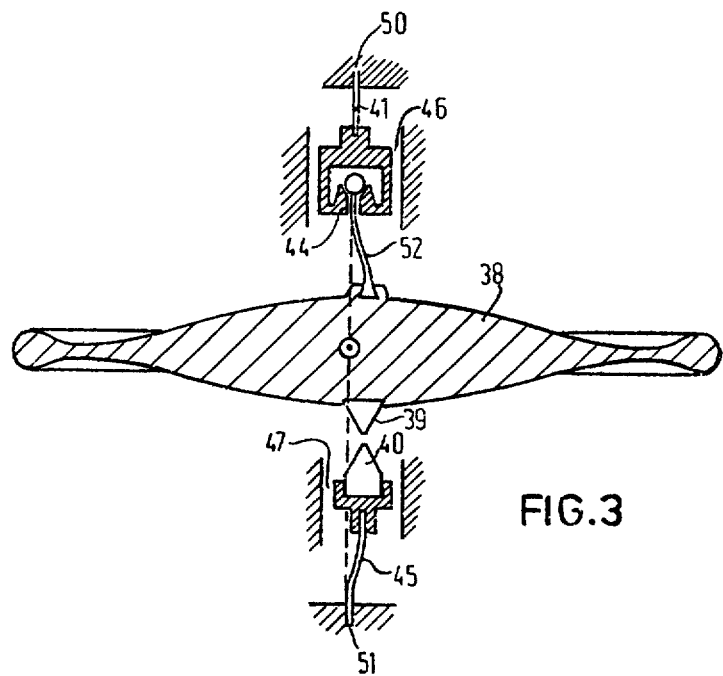
FIG. 3 is a variant of FIG. 2.

FIG. 3 shows a variant, in which the spherical pivot bearing is placed at the top and the magnetic support at the bottom. In this case, the pivot sphere is connected by a suspended, flexible pivot shaft 52 to the rotor disc 38.

Figure 4:
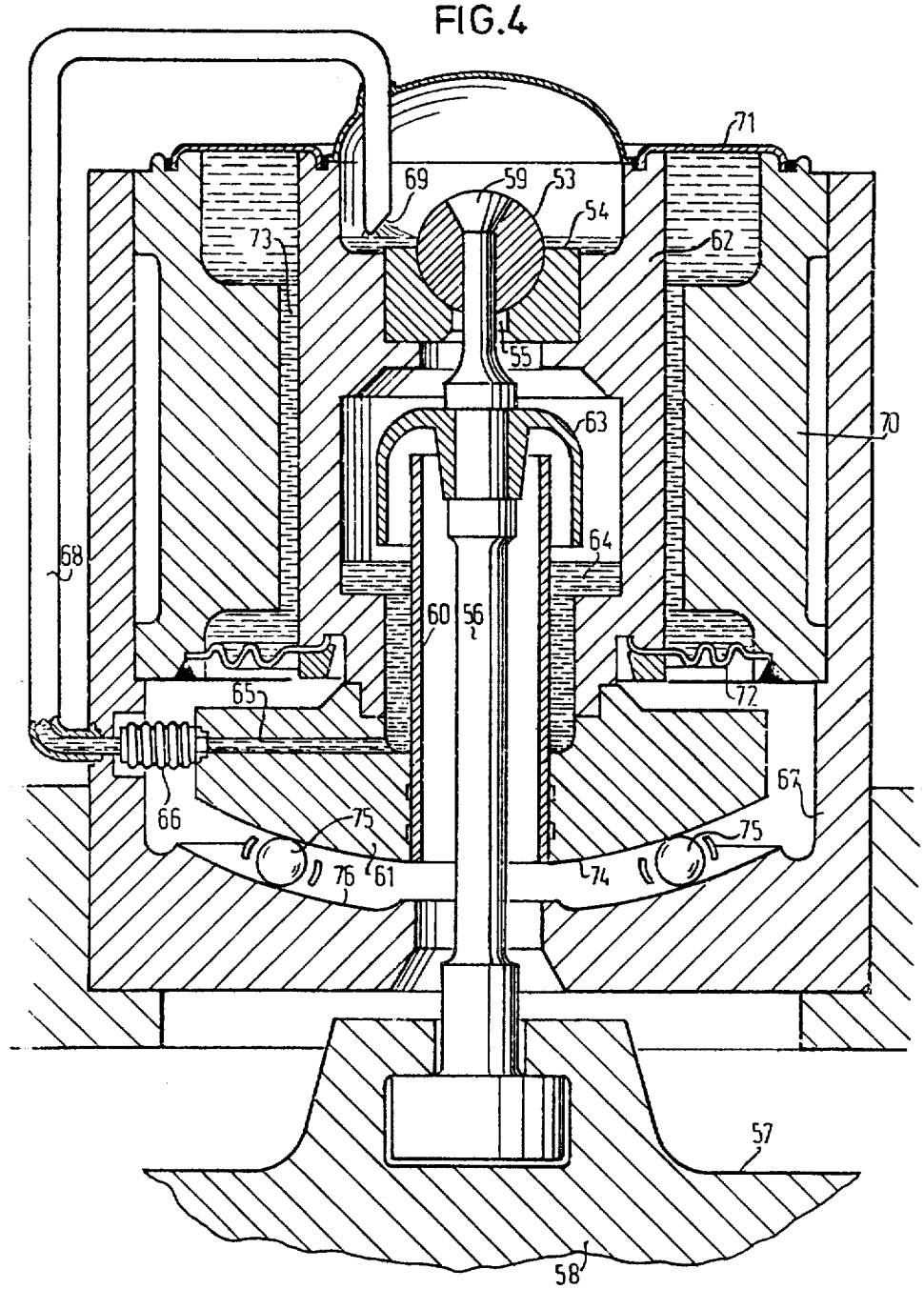
FIG. 4 is a vertical cross section through a spherical pivot used as upper bearing of a flywheel set.

FIG. 4 shows in vertical cross section a spherical pivot bearing capable of being used at the top of a flywheel set mounted with a vertical axis of rotation.

The pivot sphere 53 is here supported in a bearing cup 54, which has an opening 55 at the bottom. A pivot shaft 56 extends downwards through this opening, in such a way that its lower end is fitted in the upper surface 57 of a flywheel disc 58. The upper end of the pivot shaft 56 extends through a cylindrical wall 60, the lower end of which is sealed to the bottom 61 of the damping member 62. A shielding cap 63 is placed over the upper end of the cylinder 60, allowing the lubricant to drip down into the lubricant reservoir 64. From there it is conveyed through the duct 65 with the aid of a small bellows pump 66, which functions owing to the oscillatory motions of part 61 with respect to the housing 67. Under the action of this small pump 66, the lubricant is returned through the tube 68 to the spherical pivot bearing 53, where this tube opens at 69, just above the horizontal equator plane of the sphere 53. The housing 67 encloses a part 70 which is closed at the top by means of an elastic but flat membrane 71 and at the bottom by means of a corrugated membrane 72. Reference 73 indicates a damping gap filled entirely with damping fluid. Part 61 is furnished at its bottom with a spherically finished front 74, supported by a number of balls 75, which in turn rest upon a likewise spherically finished supporting surface 76 in the bottom of the housing 67. The centre of the spherical surface 74 as well as that of the spherical surface 76 coincides with the centre of the pivot sphere 53.

Figure 5:
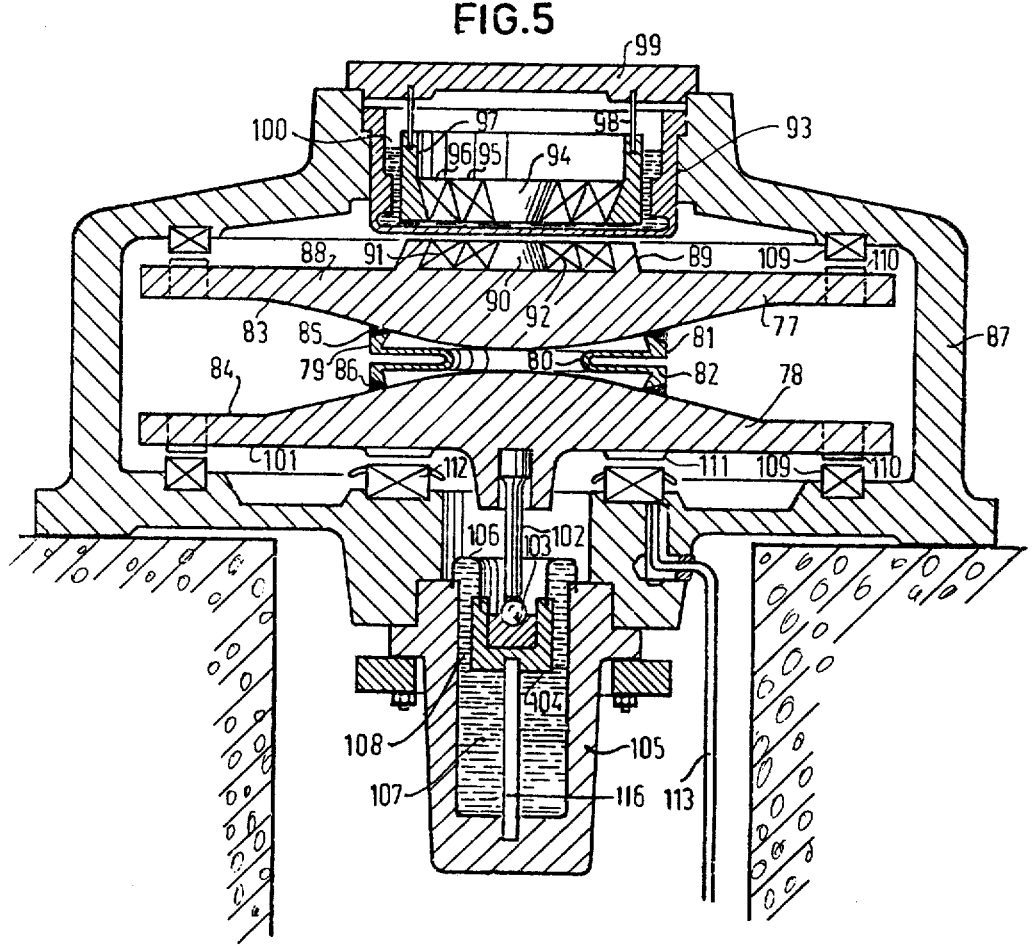
FIG. 5 is a vertical cross section through a flywheel set equipped with a rotor composed of two discs.

FIG. 5 shows a flywheel set, the rotor of which is composed of two individual flywheels 77 and 78, connected one to the other by an elastic link 79 composed of the pleat 80 of bellows folded inside the hub portions 81 and 82 of which are fastened to the flanks 83 and 84 by welded joints 85 and 86. The flywheel rotor is placed inside a housing 87, which is evacuated in a manner not further specified here, but already discussed in the description of FIG. 1. The top flank 88 of flywheel 77 is largely constituted by a flat surface which bears a hub 89 accommodating a central magnet 90 which is surrounded by two magnetic rings 91 and 92. Above these, inside the housing 87, there is a space 93, inside which a central magnet 94, surrounded by two magnetic rings 95 and 96, is so fitted within a suspension element 97 that this entire assembly of magnets can be suspended, by a few inside wires or small rods 98, from the lid 99. A considerable part of the space 100 is filled with a damping fluid.

The rotor disc 78, which is provided with a flat lower flank 101, is supported at its bottom by a thin pivot 102, which terminates in a pivot sphere 103. The damping member 104, in which the pivot sphere 103 is supported, is connected to the housing 105 with the aid of a rounded membrane 106, the member 104 being supported by a thin rod 116 which is elastic to such an extent that the damping body can oscillate with relative ease in the space 107 which is filled with fluid, these motions being damped in the damping gap 108.

References 109 and 110 indicate members placed opposite each other, under the—preferably electromagnetic—action of which the rotor disc 78 can shift in the horizontal plane, but cannot undergo any significant oscillations. References 111 and 112 indicate the rotor and the stator, respectively, of the electrical unit, which can perform a motor function as well as a generator function, in case it is desired to separate these functions from the stabilizing function. The cables 113 allow electric energy to be supplied to the flywheel set, and to be extracted from it at a later stage.

Figure 6:
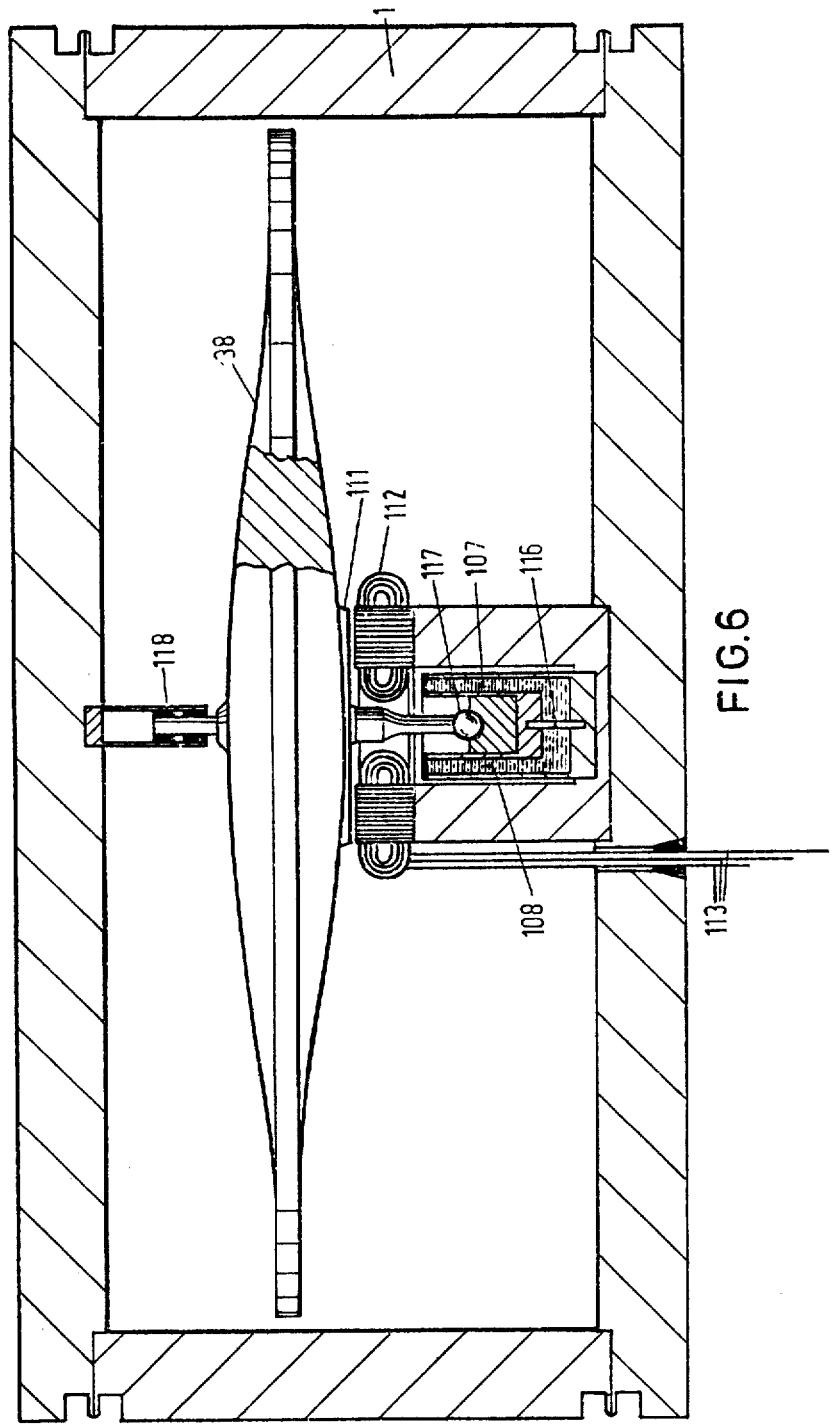
FIG. 6 is a vertical cross section through a flywheel set equipped with one spherical pivot bearing and an elastic pin bearing.

FIG. 6 shows a vertical cross section through a flywheel set provided with a spherical pivot bearing 117 and an elastic pin bearing 118. Such a pin bearing, which also possesses damping properties is described in greater detail in the patent application 76 06 439 (B 83 Netherlands). The other parts shown in FIG. 6 are provided with reference numbers corresponding to those of preceding figures, so that they require no further explanation.

Figure 7:
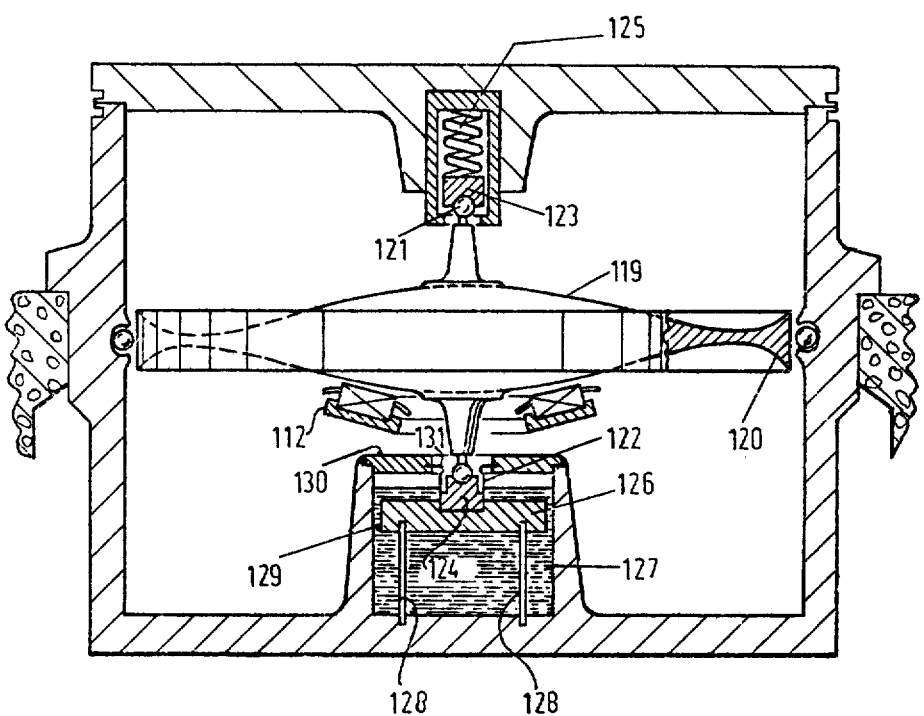
FIG. 7 is a vertical cross section through a flywheel rotor with axially prestressed spherical pivot bearings.

FIG. 7 likewise a vertical cross section, shows a variation of FIGS. 2 and 3 in some more detail. The flywheel 119 is now provided with an expanded rim 120, the external boundary surface of which is finished cylindrically. Two pivot spheres 121 and 122 are provided, which rest in bearing blocks 123 and 124 respectively. Bearing block 123 is pressed down by a spring 125. The pivot spheres are under all circumstances pressed thereby into the recesses of the bearing blocks, thus preventing the pivot spheres from rebounding in the bearings. Quiet running is therefore ensured.

The bearing block 124 is mounted on a damping body 126 which is accommodated inside a damper vessel 127 filled with damping fluid.

This damping body is supported by a number of supporting members 128, which have low resilience in the transverse direction and which can be arranged, for instance, in a circle. A damping gap is provided at 129. The damper vessel is closed with a lid 130, which has a sealing ring 131 in the middle so as to prevent loss of oil. This ring 131 is provided in the form of a membrane, the inside edge of which is bent over and attached to the bearing block 124, which is thus enabled to perform radial motions.

For the sake of simplicity, no details have been shown of the damping system at the upper bearing. However, an emergency bearing 132 is indicated schematically in the wall of the housing 1, the purpose of which is to keep the flywheel under control in case one of the pivot bearing should get out of order.

What is claimed is:

1. In combination with a rotatable substantially vertical high speed flywheel rotor assembly for accumulating kinetic energy of rotation, the rotor assembly having an upper extremity supported with the aid of a magnetic radial bearing having a polarly magnetized ring mounted concentrically to the upper end of the rotor assembly so as to rotate with the rotor assembly, a stationary identically polarized magnetic upper ring arranged concentrically to the rotatable ring and separated from the rotatable ring by a gap whereby the stationary and rotatable rings face each other and magnetically attract each other to support the rotor assembly and stabilize the rotor assembly against radial movement, an electric motor generator unit having an electrical stator concentric with and surrounding the rotor assembly for performing a motor function as well as a generator function, lower support means including axial thrust bearing means engageable with the lower part of the rotor assembly for rotational support of the rotor assembly, upper support means at the upper end of the rotor assembly for rotational support of the upper part of the rotor assembly, said supporting means at both rotor ends having means, permitting radial displacements of these ends which are corrected by centring restoring forces, these means comprising damping means and being so dimensioned that the critical speed of the rotor assembly as resulting from the elasticity of the supporting means is lower than the lowest operational speed of the rotor assembly, by means of the supporting member of the damping means of the axial thrust bearing having a relatively low resilience.

* * * * *